US009710076B2

(12) United States Patent
Angermayer

(10) Patent No.: US 9,710,076 B2
(45) Date of Patent: Jul. 18, 2017

(54) PRECISE SELECTION BEHAVIOR FOR SLIDERS BY INTERPRETING A SECOND FINGER TOUCH

(71) Applicant: Thomas Angermayer, Stetten (DE)

(72) Inventor: Thomas Angermayer, Stetten (DE)

(73) Assignee: SuccessFactors, Inc., South San Francisco, CA (US)

( * ) Notice: Subject to any disclaimer, the term of this patent is extended or adjusted under 35 U.S.C. 154(b) by 149 days.

(21) Appl. No.: 14/539,823

(22) Filed: Nov. 12, 2014

(65) Prior Publication Data
US 2016/0132138 A1   May 12, 2016

(51) Int. Cl.
*G06F 3/0354*   (2013.01)
*G06F 3/041*   (2006.01)

(52) U.S. Cl.
CPC ...... *G06F 3/03547* (2013.01); *G06F 3/03548* (2013.01); *G06F 3/0412* (2013.01); *G06F 2203/04104* (2013.01); *G06F 2203/04808* (2013.01)

(58) Field of Classification Search
CPC ............ G06F 3/03548; G06F 3/03547; G06F 3/0412; G06F 2203/04104; G06F 2203/04808
See application file for complete search history.

(56) References Cited

U.S. PATENT DOCUMENTS

| 6,931,594 | B1* | 8/2005 | Jun ........................ G11B 27/34 715/719 |
| 8,176,438 | B2* | 5/2012 | Zaman .................. G06F 3/0481 715/786 |
| 8,737,821 | B2* | 5/2014 | Li .......................... H04N 5/783 345/173 |
| 9,342,180 | B2* | 5/2016 | Westerman ........... G06F 3/0235 |
| 9,411,491 | B2* | 8/2016 | Park .................... G06F 3/04847 |
| 2002/0063737 | A1* | 5/2002 | Feig .................... G06F 3/04847 715/786 |
| 2007/0080940 | A1* | 4/2007 | Aoki ..................... G06F 3/0308 345/158 |
| 2007/0198111 | A1* | 8/2007 | Oetzel ................. G06F 3/04855 700/94 |
| 2009/0282362 | A1* | 11/2009 | Matsumoto ......... G06F 3/04855 715/787 |
| 2009/0315841 | A1* | 12/2009 | Cheng ................. G06F 3/04883 345/173 |

(Continued)

*Primary Examiner* — Lun-Yi Lao
*Assistant Examiner* — Kelly Hegarty
(74) *Attorney, Agent, or Firm* — Mintz Levin Cohn Ferris Glovsky and Popeo, P.C.

(57) ABSTRACT

Methods and apparatus, including computer program products, are provided for finger gestures. In one aspect there is provided a method, which may include detecting a first finger gesture proximate to or making contact with a slider element presented on a user interface; detecting a second finger gesture proximate to or making contact with the user interface, the second finger gesture detected during a time period comprising a time when the first finger is proximate to or making contact with the slider; and changing a resolution of the slider from a first resolution value to a second resolution value, when the second finger gesture is detected. Related systems, methods, and articles of manufacture are also described.

21 Claims, 4 Drawing Sheets

(56) References Cited

U.S. PATENT DOCUMENTS

| | | | |
|---|---|---|---|
| 2010/0156830 A1* | 6/2010 | Homma | G06F 3/04847 345/173 |
| 2011/0074714 A1* | 3/2011 | Ogawa | G06F 3/0485 345/173 |
| 2012/0206481 A1* | 8/2012 | Endo | G06F 3/0481 345/619 |
| 2012/0206495 A1* | 8/2012 | Endo | G06F 3/0481 345/661 |
| 2013/0036384 A1* | 2/2013 | Murata | G06F 3/0482 715/815 |
| 2013/0050081 A1* | 2/2013 | Tu | G06F 3/041 345/163 |
| 2013/0112202 A1* | 5/2013 | Fogelbrink | A61M 16/00 128/204.21 |
| 2013/0293504 A1* | 11/2013 | Heinrich | G06F 3/017 345/173 |
| 2014/0101535 A1* | 4/2014 | Kim | G06F 3/1431 715/234 |
| 2014/0161422 A1* | 6/2014 | Peng | G11B 27/034 386/278 |
| 2014/0359435 A1* | 12/2014 | Zheng | G06F 3/0488 715/702 |
| 2015/0177980 A1* | 6/2015 | Yanase | G06F 3/04883 345/174 |
| 2016/0070461 A1* | 3/2016 | Herbordt | G06F 3/04883 345/178 |

\* cited by examiner

PRECISE SELECTION BEHAVIOR FOR SLIDERS BY INTERPRETING A SECOND FINGER TOUCH

FIELD

The present disclosure generally relates to finger gestures.

BACKGROUND

Touch-based devices have become increasingly important for computer-based devices. For example, smart phones, tablets, and other devices include touch sensitive user interfaces to allow a user to make selections. Although touch-based devices may allow a user to touch a user interface to interact with the device, gestures used to interact with the device may not be intuitive or may be difficult for some users to gesture, making it difficult for the users to interact with the device via touch.

SUMMARY

Methods and apparatus, including computer program products, are provided for finger gestures.

In one aspect there is provided a method, which may include detecting a first finger gesture proximate to or making contact with a slider element presented on a user interface; detecting a second finger gesture proximate to or making contact with the user interface, the second finger gesture detected during a time period comprising a time when the first finger is proximate to or making contact with the slider; and changing a resolution of the slider from a first resolution value to a second resolution value, when the second finger gesture is detected.

In some implementations, the above-noted aspects may further include additional features described herein including one or more of the following. The time period may further include a predetermined timeout period. The detecting the second finger gesture may further include detecting the second finger gesture proximate to or making contact with the user interface, when the second finger gesture is proximate to or making contact with a predetermined region of a touch-sensitive display. The predetermined region may be a region associated with a presentation of a video on the user interface. The second resolution value may be sent to the user interface including a video player to enable a resolution change at the video player. Another second finger gesture proximate to or making contact with the user interface may be detected, wherein the other second finger gesture is detected during the time period comprising the time when the first finger is proximate to or making contact with the slider. The resolution of the slider may be changed to a third resolution value, when the other second finger gesture is detected.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1A:
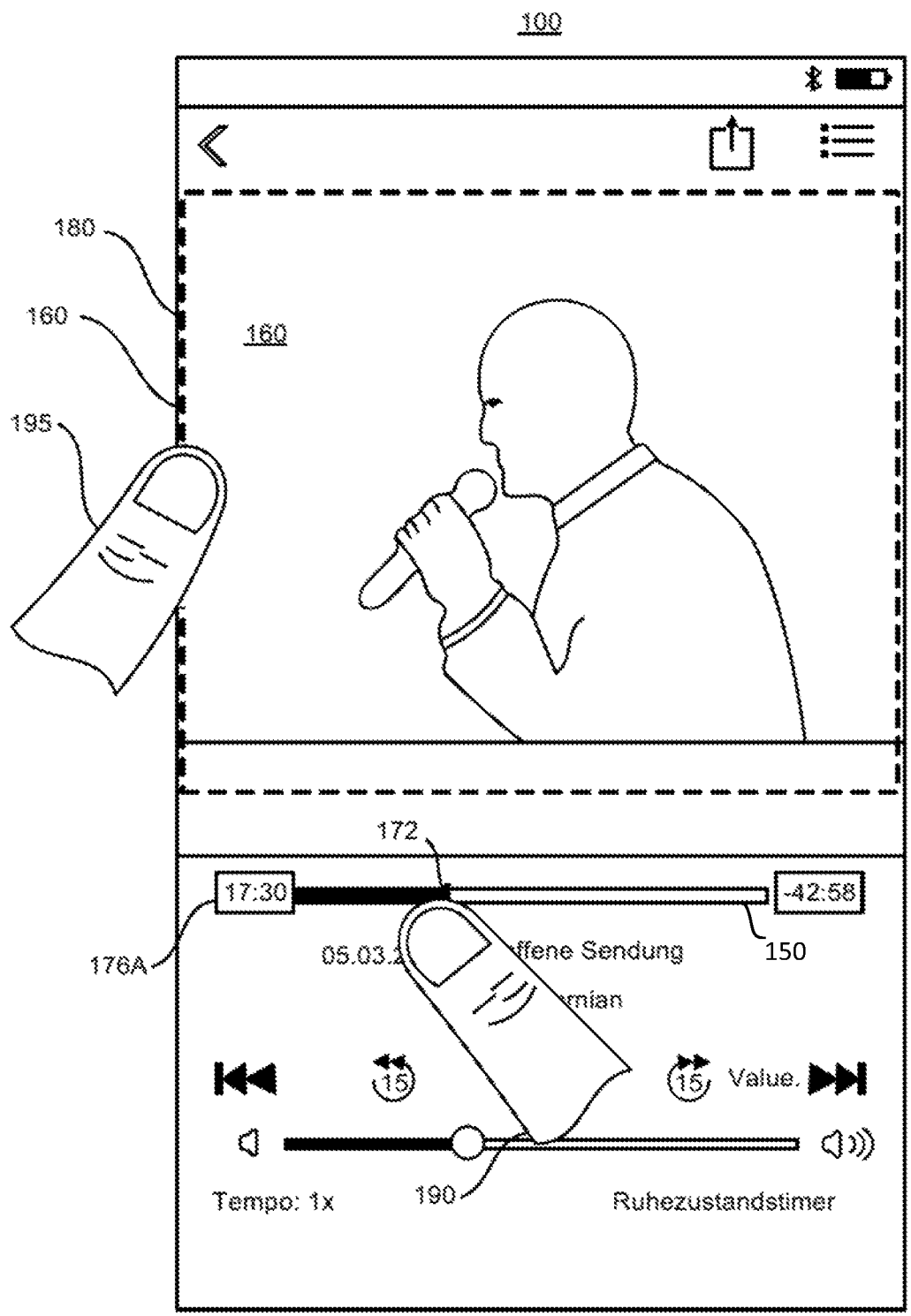
FIGS. 1A and 1B depict an example of a user interface including a slider and the two-finger gesture.

Like labels are used to refer to same or similar items in the drawings.

DETAILED DESCRIPTION

FIG. 1A depicts an example of a user interface 100 including a slider 150. A slider refers to a user interface element that is configured to vary a value via a sliding touch action. In the example of FIG. 1A, slider 150 may vary a value, such as a time or a frame number, for the video being presented within video (or video player) 160 at user interface 100.

To illustrate further, a finger gesture 190 may make contact with slider 150. The current position 172 of the slider may be moved (via finger gesture 190) to vary what portion of the video is being presented. In the example, finger gesture 190 moves the video being presented at 160 to position 172, which corresponds to a value within the video clip being presented. However, using a first finger gesture 190 alone to move slider 150 to a specific time in the video clip can be very difficult, if not impossible. If the first finger gesture 190 alone is used to move to a very specific time, such as 17:02, within video 160, the resolution of slider 150 movement using the first finger gesture 190 alone can make it difficult, if not impossible, to precisely select the desired time of 17:02. In this example, the resolution of the slider 150 may get the video to time 17:30 but not exactly 17:02.

Figure 1B:
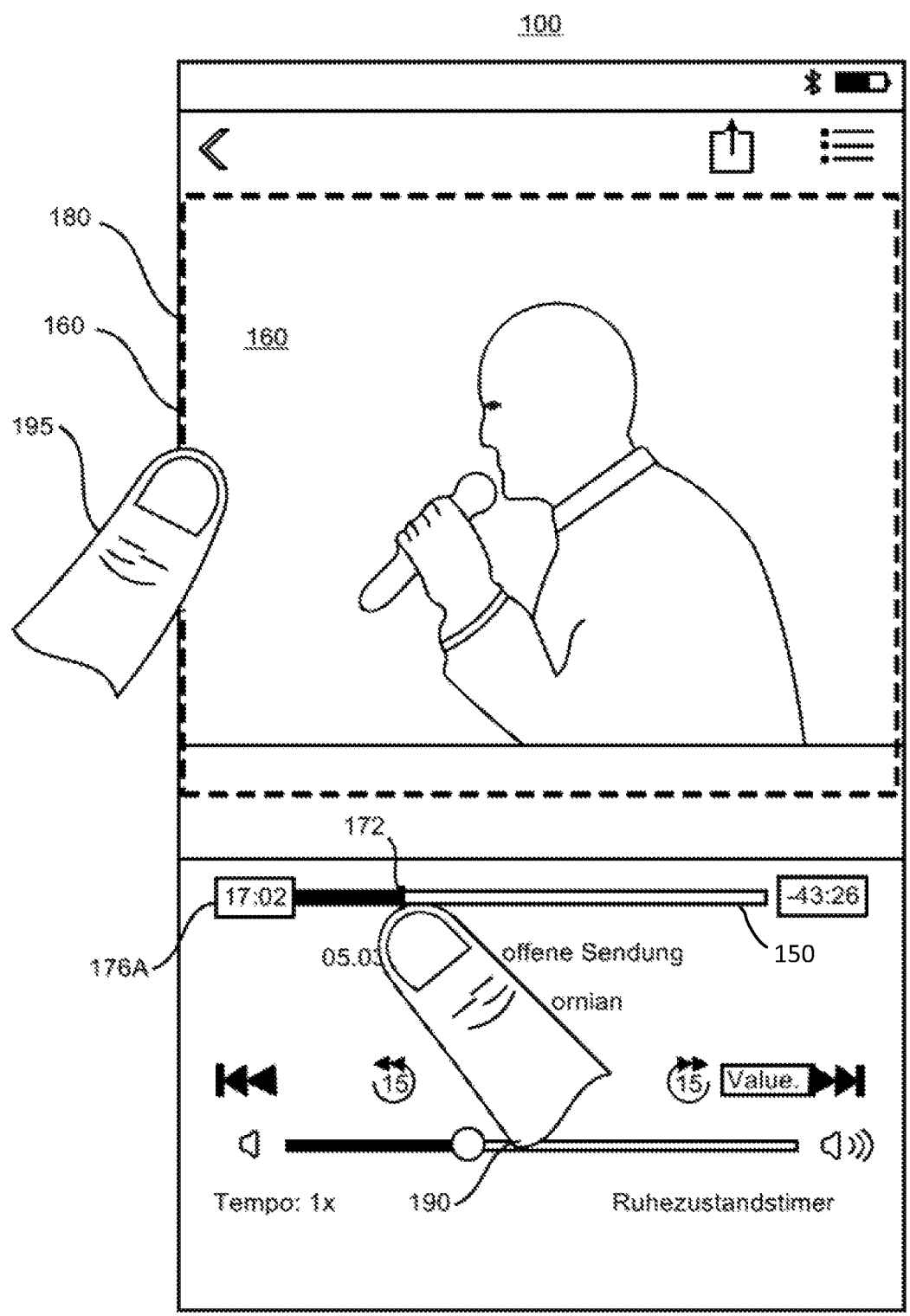

In some example implementations, a second finger gesture 195 may be used to adjust the resolution of slider 150. For example, while first finger gesture 190 is moving slider 150, a second finger gesture 195 may select (for example, tap, touch, and the like) a portion of the user interface 100 to vary the resolution of the slider 150 action. To illustrate further, a first touch of the second finger gesture 195 may reduce the resolution of slider 150 action from 30 seconds to 1 seconds, so the rate of change of the movement caused by the first finger gesture 190 moving along slider 150 may slow to enable a precise selection of a given time, such as the 17:02 as shown in FIG. 1B.

In some implementations, the second finger gesture 195 may be used to vary the resolution among a plurality of resolutions. For example, the second finger gesture may tap a first time on user interface 100 to select a 1 second resolution, a second tap may select another resolution (for example, 15 second); and so forth.

By way of an example, a podcast being presented at 160 may have a one-hour run time. The target time within the podcast is 12 minutes 45 seconds. The first finger gesture 190 may be used to select for presentation at 160 that portion of the video that corresponds to a rough value between 12 and 14 minutes as the resolution of the slider 150 for the video (or video player presenting the video) 160 enables a coarse selection of for example 12 minutes and 55 seconds. The second finger gesture 195 may change the slider resolution to seconds, so moving slider 150 changes, with a resolution of seconds, the portion of the video in second increments allowing a more precise selection of for example 12 minutes and 45 seconds.

Although the previous example refers to specific values for the resolutions, other resolution values may be selected by the second finger gesture as well. Moreover, although the previous example described slider 150 and first and second finger gestures 190 and 195 being used in conjunction with video 160, slider 150 and first and second finger gestures 190 and 195 may be used with other types of data as well including for example audio, music, and the like.

Figure 2:
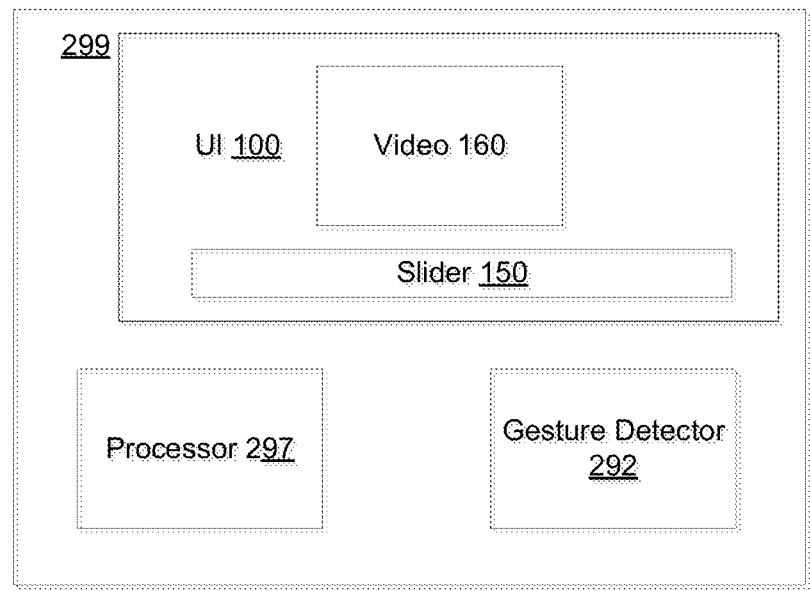
FIG. 2 depicts an example of a system for detecting the two-finger gesture.

FIG. 2 depicts a system 299 for gesturing, in accordance with some example implementations. The description of FIG. 2 also refers to FIGS. 1A-1B.

System 299 may include user interface 100, a processor 297, and a gesture detector 292.

The user interface 100 may include a slider 150 and a video player 160. The user interface may be implemented via a display including one or more touch sensitive regions where finger gestures 190 and 195 can be detected. For example, an application, such as a browser and the like, may include slider 150 and video player 160, so that a video may be presented via a touch sensitive display.

The processor 297 may include at least one processor circuitry and at least one memory including computer code, which when executed may provide one or more of the functions disclosed herein. For example, gesture detector 292 may be implemented using processor 297, although gesture detector 292 may be implemented using a dedicated processor and/or portions of gesture detector 292 may be incorporated into user interface 100 and/or a touch sensitive display (as well as corresponding display circuitry).

Figure 3:
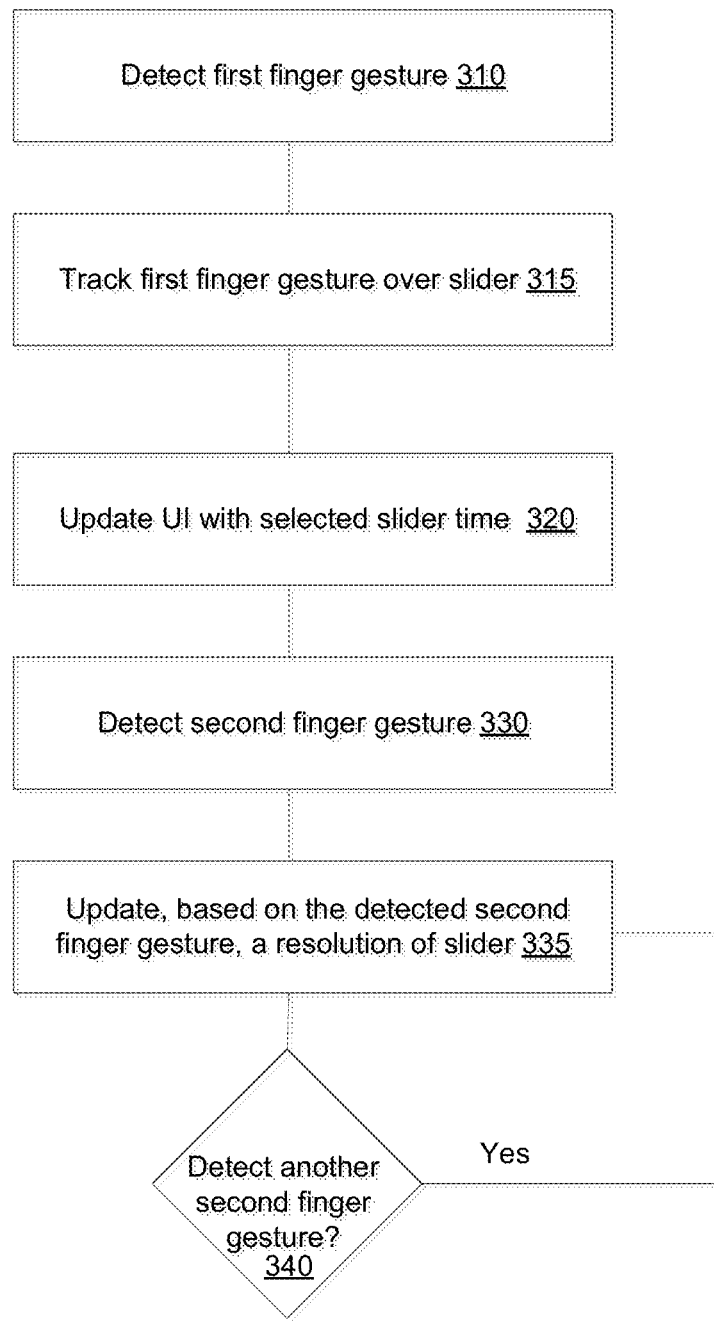
FIG. 3 depicts an example of a processor for detecting a two-finger gesture.

FIG. 3 depicts a process 300 for two-finger gesturing, in accordance with some example implementations. The description of FIG. 3 also refers to FIGS. 1 and 2.

At 310, a first finger gesture may be detected. For example, when finger gesture 190 touches (or is proximate to) a touch sensitive display presenting slider 150, gesture detector 292 may detect this touch event with respect to slider 150. As the first finger gesture 190 moves along slider 150, gesture detector 292 may track, at 315, one or more events associated with the sliding touch action in order to determine a time value for the first finger gesture 190. For example, first finger gesture 190 may move along slider 150 to one or more positions, such as position 172, which may correspond to a value or a time within video 160. In the example of FIG. 1B, the current position 172 of slider 150 corresponds to a time "17:02" (176B), and this time represents a certain instant of time or frame of a video at video player 160.

Unless otherwise indicated, a touch may make actual contact with a display and/or be proximate to the display (not making actual contact) as some displays do not require actual contact.

At 320, user interface 100 and/or other components of system 299 may be updated with the value, such as time, selected via slider 150 and finger gesture 190. For example, when first finger gesture 190 moves along slider 150 to position 172 (which represent the current position of finger gesture 190 as well as a time within the video at 160), gesture detector 292 may track the movement and provide to user interface updated information, such as the current time 17:02 (176B). The tracked movement may also be provided to video player 160 to update the presentation of the video as well.

At 330, a second finger gesture may be detected. For example, gesture detector 292 may detect second finger gesture 195, when second finger gesture 195 touches (or is proximate to) the touch sensitive display presenting user interface 100. In some implementations, the touch of the second finger gesture 195 may be detected when the second finger gesture 195 touches a predetermined portion of user interface 100. For example, the second finger gesture 195 may be required to touch the video player 160 display region 180 (for example, a touch sensitive display region associated with the display of the video) in order to be detected as a second finger gesture.

At 330, gesture detector 292 may only recognize the second finger gesture 195 when the first finger gesture 190 is actually moving the slider 150 (or within a predetermined time out period after moving the slider 150). For example, while the first finger gesture is moving the slider 150 (or within a predetermined time period, such as 0.5 seconds, 1 second, 2 seconds, 3 seconds, 4 seconds, 5 seconds, and/or other times, since a slider movement), gesture detector 292 may detect the second finger gesture. But if the first finger gesture is not moving the slider (or the timeout period has elapsed), gesture detector 292 may not detect the second finger gesture. Although the previous example described the second finger gesture 195 as a touch or tap of the user interface, other gestures may be used as well. For example, other gestures, such as a pinch as well as any other gesture may be used as well. Moreover, the touches may be proximate, as noted, to the user interface (so actual contact may not occur).

At 335, the resolution of the slider 150 may be changed based on the detected second finger gesture 195. For example, when gesture detector 292 detects the second finger gesture, gesture detector (or processor 292) may change the resolution of the slider 150. Referring to the example of FIG. 1, the detected second finger gesture may change the resolution to a slower time, such as 1 second and the like, although other resolution times or values may be used as well including increases in time/value. Additionally, the resolution may revert back to a prior or a default resolution. The updated resolution may also be provided to a video player 160 as well.

At 340, another second finger gesture may be detected. For example, the second finger gesture 195 may make contact with the user interface a second time, and this second contact may change the resolution of slider 150 yet again (yes at 340). For example, the second contact by second finger gesture 195 may change toggle the resolution from 1 second to a larger resolution, such as 2 seconds, 5 seconds, 10 seconds, 15 seconds, 20 seconds, 30 seconds, 1 minute, 5 minutes, 15 minutes, and/or any other resolution time or value. In some implementations, the second finger gesture may return the resolution to the resolution used prior to the update at 335. For example, slider 150 may be configured with a first resolution (for example, 30 second increments) which changes to 1 second with the update at 335 caused by the second finger gesture 330, but if a second finger tap is detected at 340, the resolution of the slider 150 may toggle back to 30 second increments.

Moreover, multiple touches of the second finger gesture may be used to select among a plurality of resolutions. For example, a first contact of the second finger gesture may result in a 1 second resolution, a second contact of the second finger gesture may result in a 2 second resolution, a third contact of the second finger gesture may result in a 5 second resolution, a fourth contact of the second finger gesture may result in a 10 second resolution, a fifth contact of the second finger gesture may result in 10 minute resolution, and so forth, although other time values may be used as well. Additionally, the resolution may revert back to a prior or a default resolution.

Although the previous example describes a specific use case, other uses cases may be implemented as well.

Without in any way limiting the scope, interpretation, or application of the claims appearing below, a technical effect of one or more of the example embodiments disclosed herein is enhanced control of media presentation on device, such as handheld devices including cell phones, tablets, smart phones, and/or laptops/computers having touch sensitive displays.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A system comprising:
   at least one processor; and
   at least one memory including computer program code which when executed by at least one processor causes operations comprising:
   detecting, during a first time period, a first finger gesture proximate to or making contact with a slider element presented on a user interface, wherein the first finger gesture changes, based on a current resolution of the slider element, at least a time of a video presented on the user interface during the first time period or a frame of the video;
   detecting, during a second time period, a second finger gesture proximate to or making contact with the user interface, the second finger gesture separate from the first finger gesture and the second time period different from the first time period; and
   changing, when the second finger gesture is detected during a third time period comprising the first time period, the current resolution from a first resolution value to a second resolution value that is greater than or less than the first resolution value, the current resolution corresponding to a rate of change in at least the time of the video or the frame of the video, the second finger gesture causing the current resolution to toggle among a plurality of predetermined resolutions to enable user selection of the current resolution, and the plurality of predetermined resolutions comprising the first resolution value and the second resolution value.

2. The system of claim 1, wherein the third time period further includes a predetermined timeout period.

3. The system of claim 1, wherein the detecting the second finger gesture further comprises:
   detecting the second finger gesture proximate to or making contact with the user interface, when the second finger gesture is proximate to or making contact with a predetermined region of a touch-sensitive display.

4. The system of claim 3, wherein the predetermined region is a region associated with a presentation of the video on the user interface.

5. The system of claim 1, wherein the operations further comprise:
   sending the second resolution value to the user interface including a video player to enable a resolution change at the video player.

6. The system of claim 1, wherein the operations further comprise:
   detecting, during a fourth time period subsequent to the second time period, a third finger gesture proximate to or making contact with the user interface, the third finger gesture separate from the first finger gesture and the second finger gesture, the fourth time period different from the first time period and the second time period; and
   changing, when the third finger gesture is detected during the third time period and subsequent to the second time period, the current resolution from the second resolution value to a third resolution value that is greater than or less than the second resolution value, the plurality of predetermined resolutions comprising the third resolution value.

7. The system of claim 6, wherein the third resolution value is the same as the first resolution value.

8. The system of claim 1, wherein the current resolution is changed without changing of the appearance of the slider element.

9. A non-transitory computer-readable storage medium including computer program code which when executed at least one processor causes operations comprising:
   at least one processor; and
   at least one memory including computer program code which when executed by at least one processor causes operations comprising:
   detecting, during a first time period, a first finger gesture proximate to or making contact with a slider element presented on a user interface, wherein the first finger gesture changes, based on a current resolution of the slider element, at least a time of a video presented on the user interface during the first time period or a frame of the video;

detecting, during a second time period, a second finger gesture proximate to or making contact with the user interface, the second finger gesture separate from the first finger gesture and the second time period different from the first time period; and changing, when the second finger gesture is detected during a third time period comprising the first time period, the current resolution from a first resolution value to a second resolution value that is greater than or less than the first resolution value, the current resolution corresponding to a rate of change in at least the time of the video or the frame of the video, the second finger gesture causing the current resolution to toggle among a plurality of predetermined resolutions to enable user selection of the current resolution, and the plurality of predetermined resolutions comprising the first resolution value and the second resolution value.

10. The non-transitory computer-readable storage medium of claim 8, wherein the third time period further includes a predetermined timeout period.

11. The non-transitory computer-readable storage medium of claim 9, wherein the detecting the second finger gesture further comprises:

detecting the second finger gesture proximate to or making contact with the user interface, when the second finger gesture is proximate to or making contact with a predetermined region of a touch-sensitive display.

12. The non-transitory computer-readable storage medium of claim 11, wherein the predetermined region is a region associated with a presentation of the video on the user interface.

13. The non-transitory computer-readable storage medium of claim 9, wherein the operations further comprise:

sending the second resolution value to the user interface including a video player to enable a resolution change at the video player.

14. The non-transitory computer-readable storage medium of claim 9, wherein the operations further comprise:

detecting, during a fourth time period subsequent to the second time period, a third finger gesture proximate to or making contact with the user interface, the third finger gesture separate from the first finger gesture and the second finger gesture, the fourth time period different from the first time period and the second time period; and changing, when the third finger gesture is detected during the third time period and subsequent to the second time period, the current resolution from the second resolution value to a third resolution value that is greater than or less than the second resolution value, the plurality of predetermined resolutions comprising the third resolution value.

15. The non-transitory computer-readable storage medium of claim 14, wherein the third resolution value is the same as the first resolution value.

16. A method comprising:

detecting, during a first time period, a first finger gesture proximate to or making contact with a slider element presented on a user interface, wherein the first finger gesture changes, based on a current resolution of the slider element, at least a time of a video presented on the user interface during the first time period or a frame of the video;

detecting, during a second time period, a second finger gesture proximate to or making contact with the user interface, the second finger gesture separate from the first finger gesture and the second time period different from the first time period; and changing, when the second finger gesture is detected during a third time period comprising the first time period, the current resolution from a first resolution value to a second resolution value that is greater than or less than the first resolution value, the current resolution corresponding to a rate of change in at least the time of the video or the frame of the video, the second finger gesture causing the current resolution to toggle among a plurality of predetermined resolutions to enable user selection of the current resolution, and the plurality of predetermined resolutions comprising the first resolution value and the second resolution value.

17. The method of claim 16, wherein the third time period further includes a predetermined timeout period.

18. The method of claim 16, wherein the detecting the second finger gesture further comprises:

detecting the second finger gesture proximate to or making contact with the user interface, when the second finger gesture is proximate to or making contact with a predetermined region of a touch-sensitive display.

19. The method of claim 18, wherein the predetermined region is a region associated with a presentation of the video on the user interface.

20. The method of claim 16, further comprising:

sending the second resolution value to the user interface including a video player to enable a resolution change at the video player.

21. The method of claim 16, further comprising:

detecting, during a fourth time period subsequent to the second time period, a third finger gesture proximate to or making contact with the user interface, the third finger gesture separate from the first finger gesture and the second finger gesture, the fourth time period different from the first time period and the second time period; and changing, when the third finger gesture is detected during the third time period and subsequent to the second time period, the current resolution from the second resolution value to a third resolution value that is greater than or less than the second resolution value, the plurality of predetermined resolutions comprising the third resolution value.

* * * * *

UNITED STATES PATENT AND TRADEMARK OFFICE
CERTIFICATE OF CORRECTION

| | | |
|---|---|---|
| PATENT NO. | : 9,710,076 B2 | Page 1 of 1 |
| APPLICATION NO. | : 14/539823 | |
| DATED | : July 18, 2017 | |
| INVENTOR(S) | : Thomas Angermayer | |

It is certified that error appears in the above-identified patent and that said Letters Patent is hereby corrected as shown below:

In the Claims

At Column 7, Line 23, replace "8" with --9-- between "claim" and ", wherein".

Signed and Sealed this
Fifth Day of September, 2017

Joseph Matal
*Performing the Functions and Duties of the*
*Under Secretary of Commerce for Intellectual Property and*
*Director of the United States Patent and Trademark Office*